US011274606B2

(12) United States Patent
Takahashi et al.

(10) Patent No.: US 11,274,606 B2
(45) Date of Patent: Mar. 15, 2022

(54) TWO-SHAFT GAS TURBINE POWER GENERATION FACILITY, CONTROL DEVICE THEREFOR, AND CONTROL METHOD THEREFOR

(71) Applicant: Mitsubishi Hitachi Power Systems, Ltd., Yokohama (JP)

(72) Inventors: Kazuo Takahashi, Yokohama (JP); Naoyuki Nagafuchi, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 56 days.

(21) Appl. No.: 16/971,566

(22) PCT Filed: Feb. 22, 2019

(86) PCT No.: PCT/JP2019/006842
§ 371 (c)(1),
(2) Date: Aug. 20, 2020

(87) PCT Pub. No.: WO2019/163955
PCT Pub. Date: Aug. 29, 2019

(65) Prior Publication Data
US 2020/0400079 A1 Dec. 24, 2020

(30) Foreign Application Priority Data
Feb. 22, 2018 (JP) .............................. JP2018-029633

(51) Int. Cl.
*F02C 7/36* (2006.01)
*F02C 3/10* (2006.01)
(Continued)

(52) U.S. Cl.
CPC ................. *F02C 7/36* (2013.01); *F02C 3/10* (2013.01); *F02C 6/00* (2013.01); *F02C 7/232* (2013.01);
(Continued)

(58) Field of Classification Search
CPC .... F02C 9/263; F02C 9/28; F02C 9/32; F02C 9/48
See application file for complete search history.

(56) References Cited

U.S. PATENT DOCUMENTS 6,945,030 B2 * 9/2005 Hirayama ................. F02C 9/54
60/39.27
10,094,297 B2 * 10/2018 Kusumi .................... H02J 3/00
(Continued)

FOREIGN PATENT DOCUMENTS

JP 5953424 7/2016

OTHER PUBLICATIONS

International Search Report dated May 14, 2019 in International (PCT) Application No. PCT/JP2019/006842, with English translation.
(Continued)

*Primary Examiner* — Stephanie Sebasco Cheng
(74) *Attorney, Agent, or Firm* — Wenderoth, Lind & Ponack, L.L.P.

(57) ABSTRACT

A control device for a two-shaft gas turbine power generation facility includes: a basic output calculation unit which obtains a basic output command value in accordance with a required output; a component separation unit which divides the basic output command value into high and low frequency components; an opening degree command output unit which obtains an opening degree of a fuel adjustment valve and outputs an opening degree command to the fuel adjustment valve; a basic power transmission and reception amount calculation unit which obtains a basic power transmission and reception amount of the electric power between an induction motor and a power system on the basis of the high-frequency component; and a power transmission and reception command output unit which outputs a power transmission and reception command indicating a power
(Continued)

transmission and reception amount in accordance with the basic power transmission and reception amount to a frequency converter.

10 Claims, 7 Drawing Sheets

(51) Int. Cl.
    *F02C 6/00*     (2006.01)
    *F02C 7/232*     (2006.01)
    *F02C 9/26*     (2006.01)

(52) U.S. Cl.
    CPC .......... *F02C 9/263* (2013.01); *F05D 2220/32* (2013.01); *F05D 2220/76* (2013.01); *F05D 2240/35* (2013.01)

(56) References Cited

U.S. PATENT DOCUMENTS

| | | | |
|---|---|---|---|
| 10,184,406 B2* | 1/2019 | Kusumi | F02C 9/28 |
| 10,202,906 B2* | 2/2019 | Morisaki | F02C 3/113 |
| 10,358,984 B2* | 7/2019 | Hino | H02P 9/04 |
| 2009/0193782 A1* | 8/2009 | Siden | F02C 3/10 |
| | | | 60/39.15 |
| 2016/0252015 A1* | 9/2016 | Kusumi | H02P 9/04 |
| | | | 290/40 B |
| 2018/0252158 A1* | 9/2018 | Malkamaki | F02C 6/00 |

OTHER PUBLICATIONS

Written Opinion of the International Searching Authority dated May 14, 2019 in International (PCT) Patent Application No. PCT/JP2019/006842, with English translation.

* cited by examiner

TWO-SHAFT GAS TURBINE POWER GENERATION FACILITY, CONTROL DEVICE THEREFOR, AND CONTROL METHOD THEREFOR

BACKGROUND OF THE INVENTION

Field of the Invention

The present invention relates to a two-shaft gas turbine power generation facility including a two-shaft gas turbine and a generator, a control device therefor, and a control method therefor.

Priority is claimed on Japanese Patent Application No. 2018-029633, filed Feb. 22, 2018, the content of which is incorporated herein by reference.

Description of Related Art

Examples of a two-shaft gas turbine power generation facility include the facility disclosed in Patent Document 1 shown below. This two-shaft gas turbine power generation facility includes a two-shaft gas turbine, a generator, a motor, and a frequency converter.

The two-shaft gas turbine includes a compressor which compresses air to generate compressed air, a combustor which combusts a fuel in the compressed air to generate a combustion gas, a high-pressure turbine driven by the combustion gas, and a low-pressure turbine driven by an exhaust gas discharged from the high-pressure turbine. A rotor of the high-pressure turbine and a rotor of the compressor are mechanically connected to each other. Also, a rotor of the low-pressure turbine and a rotor of the generator are mechanically connected to each other. However, the rotor of the high-pressure turbine and the rotor of the low-pressure turbine are not mechanically connected to each other.

In a case in which a required output for the two-shaft gas turbine power generation facility drastically increases, a generator output may not be able to follow the drastic increase in the required output even if the output of the generator is increased by increasing a flow rate of the fuel supplied to the combustor. Therefore, in the technique described in Patent Document 1, the motor is temporarily used as a generator, and electric power generated by the motor is used to supplement a shortage of the generator output relative to the required output with an output from the motor. Further, in a case in which the required output for the two-shaft gas turbine power generation facility drastically decreases, the generator output may not be able to follow the drastic decrease in the required output even if the output of the generator is lowered by reducing the flow rate of the fuel supplied to the combustor. Therefore, in the technique described in Patent Document 1, a surplus of the generator output relative to the required output is given to the motor via a power system.

As described above, in the two-shaft gas turbine facility described in Patent Document 1, output responsiveness to a sudden change in the required output can be improved.

PATENT DOCUMENTS

[Patent Document 1] Japanese Patent No. 5953424

SUMMARY OF THE INVENTION

In a two-shaft gas turbine power generation facility, it is desired to reduce the life span consumption of devices which constitute the two-shaft gas turbine power generation facility while securing the output responsiveness as described above.

Therefore, it is an object of the present invention to provide a technique in which the life span consumption of devices which constitute a two-shaft gas turbine power generation facility can be reduced while output responsiveness is ensured in a case in which a required output suddenly changes.

A two-shaft gas turbine power generation facility according to one aspect of the present invention for achieving the above object includes: a compressor which has a compressor rotor and is configured to compress air with rotation of the compressor rotor to generate compressed air; a combustor which is configured to combust a fuel in the compressed air to generate a combustion gas; a fuel adjustment valve which is configured to control a flow rate of the fuel supplied to the combustor; a high-pressure turbine which has a high-pressure turbine rotor mechanically connected to the compressor rotor and in which the high-pressure turbine rotor is configured to be rotated by the combustion gas; a low-pressure turbine which has a low-pressure turbine rotor not connected to the high-pressure turbine rotor and in which the low-pressure turbine rotor is configured to be rotated by the combustion gas exhausted from the high-pressure turbine; a power generator which is configured to generate electric power with rotation of the low-pressure turbine rotor and is electrically connected to a power system in which AC power flows; an induction motor which has a motor rotor mechanically connected to the compressor rotor and is electrically connected to the power system in parallel with the power generator to be configured to transmit and receive electric power to and from the power system; a frequency converter which is provided between the induction motor and the power system in an electrical connection relationship to be configured to control transmission and reception of the electric power between the induction motor and the power system, is configured to convert a frequency of the electric power from the induction motor to a frequency of the power system when the electric power is transmitted from the induction motor to the power system side, and is configured to convert the frequency of the electric power from the power system to a frequency of the induction motor when the electric power is received from the power system and supplied to the induction motor; and a control device.

The control device includes: a basic output calculation unit which obtains a basic output command value in accordance with a deviation between an externally required output and an actual output that is an actual output to the power system; a component separation unit which divides the basic output command value into a high-frequency component and a low-frequency component; an opening degree command output unit which obtains an opening degree of the fuel adjustment valve on the basis of the low-frequency component of the basic output command value and outputs an opening degree command indicating the opening degree to the fuel adjustment valve; a basic power transmission and reception amount calculation unit which obtains a basic power transmission and reception amount of the electric power between the induction motor and the power system on the basis of the high-frequency component of the basic output command value; and a power transmission and reception command output unit which creates a power transmission and reception command indicating a power transmission and reception amount of the electric power between the induction motor and the power system in accordance with the basic power transmission and reception amount and outputs the power transmission and reception command to the frequency converter.

In the present aspect, the high-frequency component in the required output, in other words, a drastic change in the required output, is managed by the power transmission and reception of the induction motor for the power system. Also, in the present aspect, the low-frequency component in the required output, in other words, a relatively gradual change in the required output, is managed by the output from the power generator accompanying driving of the two-shaft gas turbine.

It is assumed that the output command value for determining the opening degree of the fuel adjustment valve includes a high-frequency component as well as a low-frequency component. In this case, the fuel adjustment valve repeats a drastic change of the opening degree in accordance with the output command value of the high-frequency component. This consumes the life span of the fuel adjustment valve in this case.

On the other hand, in the present aspect, since the output command value for determining the opening degree of the fuel adjustment valve does not include a high-frequency component, the fuel adjustment valve does not repeat the drastic change of the valve opening degree. Therefore, in the present aspect, the life span consumption of the fuel adjustment valve can be reduced. However, in the present aspect, the drastic change in the required output cannot be managed by the adjustment of the opening degree of the fuel adjustment valve. Thus, in the present aspect, as described above, the drastic change in the required output is managed exclusively by the power transmission and reception of the induction motor. In addition, the time from when the required output changes until the power transmission and reception amount for the power system changes due to the power transmission and reception of the induction motor is much shorter than the time from when the required output changes until the power generation amount of the power generator changes due to the change in the flow rate of the fuel. For this reason, in the present aspect, output responsiveness to the drastic change in the required output can be secured. The frequency converter of the present aspect repeats an abrupt operation for rapidly changing the power transmission and reception amount in accordance with the high-frequency component of the output command value. However, since the operation of the frequency converter is an electrical operation, the life span of the frequency converter is hardly consumed even if the operation is rapid or slow.

Here, in the control device, the basic power transmission and reception amount calculation unit may have a utilization factor calculator which obtains a component utilization factor in accordance with an actual rotation speed by using a predetermined relationship between the actual rotation speed which is an actual rotation speed of the high-pressure turbine and the component utilization factor, a utilized high-frequency component calculator which obtains a value obtained by multiplying the high-frequency component by the component utilization factor as a utilized high-frequency component, and a basic power transmission and reception amount output device which converts the utilized high-frequency component into the basic power transmission and reception amount and outputs the basic power transmission and reception amount.

When the power transmission and reception amount indicated by the power transmission and reception command to the frequency converter changes, a rotation speed of the induction motor changes. The motor rotor is mechanically connected to the compressor rotor, and thus, when the rotation speed of the induction motor changes, a rotation speed of the compressor also changes accordingly. When the rotation speed of the compressor changes, the flow rate of the compressed air sent to the combustor changes.

In the present aspect, since the flow rate of the fuel supplied to the combustor is determined on the basis of the low-frequency component in the required output, the flow rate of the fuel only changes gently even if the control device receives the drastically changing required output. On the other hand, in the present aspect, the rotation speeds of the induction motor and the compressor are inevitably determined on the basis of the high-frequency component in the required output, and thus, when the control device receives the drastically changing required output, the flow rate of the compressed air sent to the combustor drastically changes. For this reason, in the present aspect, in a case in which the control device receives the drastically changing required output, a fuel-air ratio, which is a ratio between the flow rate of the fuel supplied to the combustor and a flow rate of the compressed air, may deviate from a target fuel-air ratio.

That is, as in the one aspect and the present aspect described above, if the opening degree of the fuel adjustment valve is determined on the basis of the low-frequency component in the required output and the power transmission and reception amount of the induction motor is determined on the basis of the high-frequency component in the required output, the fuel-air ratio may deviate from the target fuel-air ratio and the fuel may not be stably combusted in the combustor.

On the other hand, a width of the fuel-air ratio region in which stable combustion is possible is set to be widest when the rotation speed of the high-pressure turbine is at a rated rotation speed. The width of the fuel-air ratio region in which stable combustion is possible becomes gradually narrower as the rotation speed of the high-pressure turbine becomes greater than the rated rotation speed (and as the rotation speed of the high-pressure turbine becomes lower than the rated rotation speed). For this reason, if the rotation speed of the high-pressure turbine is near the rated rotation speed, a possibility of enabling stable combustion increases even if the fuel-air ratio deviates from the target fuel-air ratio. However, as the rotation speed of the high-pressure turbine becomes higher than the rated rotation speed (and becomes lower than the rated rotation speed), the possibility of enabling stable combustion decreases.

Therefore, in the present aspect, when the basic power transmission and reception amount calculation unit obtains the basic power transmission and reception amount using the high-frequency component of the basic output command value, the utilization factor of the high-frequency component is changed in accordance with the rotation speed of the high-pressure turbine. As a result, in the present aspect, it is possible to inhibit the deviation of the actual fuel-air ratio from the target fuel-air ratio in the region in which the width of the fuel-air ratio in which stable combustion is possible is narrow.

Also, in the control device having the utilization factor calculator, the predetermined relationship is such that the component utilization factor when the actual rotation speed of the high-pressure turbine is lower and higher than an intermediate rotation speed region including the rated rotation speed of the high-pressure turbine may be smaller than the component utilization factor when the actual rotation speed is the rated rotation speed.

In the control device according to any one of the above aspects, the component separation unit may have a low-pass filter which outputs only the low-frequency component in the basic output command value, and a subtractor which outputs a value obtained by subtracting the low-frequency component from the basic output command value as the high-frequency component.

Also, the control device according to any one of the above aspects may further include a limited power transmission and reception amount calculation unit which obtains a limited power transmission and reception amount in accordance with a power transmission and reception rotation speed ratio that is a ratio of the actual rotation speed that is the actual rotation speed of the high-pressure turbine to the basic power transmission and reception amount. In this case, the limited power transmission and reception amount calculation unit may correlate a change in the limited power transmission and reception amount with a change in the power transmission and reception rotation speed ratio, obtain the power transmission and reception amount in accordance with the power transmission and reception rotation speed ratio as the limited power transmission and reception amount in an intermediate ratio section in which the power transmission and reception rotation speed ratio is between a first predetermined power transmission and reception rotation speed ratio and a second predetermined power transmission and reception rotation speed ratio that is smaller than the first power transmission and reception rotation speed ratio, and obtain the power transmission and reception amount in accordance with the power transmission and reception rotation speed ratio that is a power transmission and reception amount of which a change amount in the power transmission and reception amount with respect to a change amount in the power transmission and reception rotation ratio is smaller than that in the intermediate ratio section as the limited power transmission and reception amount in a large ratio section in which the power transmission and reception rotation speed ratio is larger than the first power transmission and reception rotation speed ratio and in a small ratio section in which the power transmission and reception rotation speed ratio is smaller than the second power transmission and reception rotation speed ratio. In this case, the power transmission and reception command output unit creates a power transmission and reception command indicating the limited power transmission and reception amount and outputs the power transmission and reception command to the frequency converter.

In the present aspect, when the limited power transmission and reception amount calculation unit obtains the limited power transmission and reception amount in a case in which the power transmission and reception-rotation speed ratio is in the large ratio section and the small ratio section, the limited power transmission and reception amount calculation unit obtains the power transmission and reception amount of which a change in the power transmission and reception amount with respect to a change in the power transmission and reception rotation speed ratio is smaller than that in the intermediate ratio section as the limited power transmission and reception amount. As a result, in the present aspect, it is possible to inhibit the deviation of the actual fuel-air ratio from the target fuel-air ratio in the region in which the width of the fuel-air ratio in which stable combustion is possible is narrow.

A control method for a two-shaft gas turbine power generation facility of one aspect according to the present invention for achieving the above object is a control method for the following two-shaft gas turbine power generation facility.

This two-shaft gas turbine power generation facility includes: a compressor which has a compressor rotor and is configured to compress air with rotation of the compressor rotor to generate compressed air; a combustor which is configured to combust a fuel in the compressed air to generate a combustion gas; a fuel adjustment valve which is configured to control a flow rate of the fuel supplied to the combustor; a high-pressure turbine which has a high-pressure turbine rotor mechanically connected to the compressor rotor and in which the high-pressure turbine rotor is configured to be rotated by the combustion gas; a low-pressure turbine which has a low-pressure turbine rotor not connected to the high-pressure turbine rotor and in which the low-pressure turbine rotor is configured to be rotated by the combustion gas exhausted from the high-pressure turbine; a power generator which is configured to generate electric power with rotation of the low-pressure turbine rotor and is electrically connected to a power system in which AC power flows; an induction motor which has a motor rotor mechanically connected to the compressor rotor and is electrically connected to the power system in parallel with the power generator to be configured to transmit and receive electric power to and from the power system; and a frequency converter which is provided between the induction motor and the power system in an electrical connection relationship to be configured to control transmission and reception of the electric power between the induction motor and the power system, is configured to convert a frequency of the electric power from the induction motor to a frequency of the power system when the electric power is transmitted from the induction motor to the power system side, and is configured to convert the frequency of the electric power from the power system to a frequency of the induction motor when the electric power is received from the power system and supplied to the induction motor.

The control method includes executing: a basic output calculation process of obtaining a basic output command value in accordance with a deviation between an externally required output and an actual output that is an actual output to the power system; a component distribution process of dividing the basic output command value into a high-frequency component and a low-frequency component; an opening degree command output process of obtains an opening degree of the fuel adjustment valve on the basis of the low-frequency component of the basic output command value and outputting an opening degree command indicating the opening degree to the fuel adjustment valve; a basic power transmission and reception amount calculation process of obtaining a basic power transmission and reception amount of the electric power between the induction motor and the power system on the basis of the high-frequency component of the basic output command value; and a power transmission and reception command output process of creating a power transmission and reception command indicating a power transmission and reception amount of the electric power between the induction motor and the power system in accordance with the basic power transmission and reception amount and outputting the power transmission and reception command to the frequency converter.

Here, in the control method, the basic power transmission and reception amount calculation process may include a utilization factor calculation process of obtaining a component utilization factor in accordance with an actual rotation speed which is an actual rotation speed of the high-pressure turbine by using a predetermined relationship between the rotation speed of the high-pressure turbine and the component utilization factor, a utilized high-frequency component calculation process of obtaining a value by multiplying the high-frequency component by the component utilization factor as a utilized high-frequency component, and a basic power transmission and reception amount output process of converting the utilized high-frequency component into the basic power transmission and reception amount and outputting the basic power transmission and reception amount.

Also, in the control method including the utilization factor calculation process, the predetermined relationship is such that the component utilization factor when the actual rotation speed of the high-pressure turbine is lower and higher than an intermediate rotation speed region including the rated rotation speed of the high-pressure turbine may be smaller than the component utilization factor when the actual rotation speed is the rated rotation speed.

Also, in any of the above control methods, the component distribution process may include a low-pass process of outputting only the low-frequency component in the basic output command value, and a subtraction process of outputting a difference between the basic output command value and the low-frequency component as the high-frequency component.

Also, any of the above control methods may further execute a limited power transmission and reception amount calculation process of obtaining a limited power transmission and reception amount in accordance with a power transmission and reception-rotation speed ratio that is a ratio of the actual rotation speed that is the actual rotation speed of the high-pressure turbine to the basic power transmission and reception amount. The limited power transmission and reception amount calculation process may include correlating a change in the limited power transmission and reception amount with a change in the power transmission and reception rotation speed ratio, obtaining the power transmission and reception amount in accordance with the power transmission and reception rotation speed ratio as the limited power transmission and reception amount in an intermediate ratio section in which the power transmission and reception rotation speed ratio is between a first predetermined power transmission and reception rotation speed ratio and a second power transmission and reception rotation speed ratio that is smaller than the first power transmission and reception rotation speed ratio, and obtaining the power transmission and reception amount in accordance with the power transmission and reception rotation speed ratio that is a power transmission and reception amount of which a change amount in the power transmission and reception amount with respect to a change amount in the power transmission and reception rotation ratio is smaller than that in the intermediate ratio section as the limited power transmission and reception amount in a large ratio section in which the power transmission and reception rotation speed ratio is larger than the first power transmission and reception-rotation speed ratio and in a small ratio section in which the power transmission and reception rotation speed ratio is smaller than the second power transmission and reception rotation speed ratio. The power transmission and reception command output process may include creating a power transmission and reception command indicating the limited power transmission and reception amount and output the power transmission and reception command to the frequency converter.

According to one aspect of the present invention, it is possible to reduce life span consumption of devices while output responsiveness is ensured in a case in which a required output suddenly changes.

DETAILED DESCRIPTION OF THE INVENTION

Hereinafter, one embodiment of a two-shaft gas turbine power generation facility according to the present invention will be described in detail with reference to the drawings.

Figure 1:
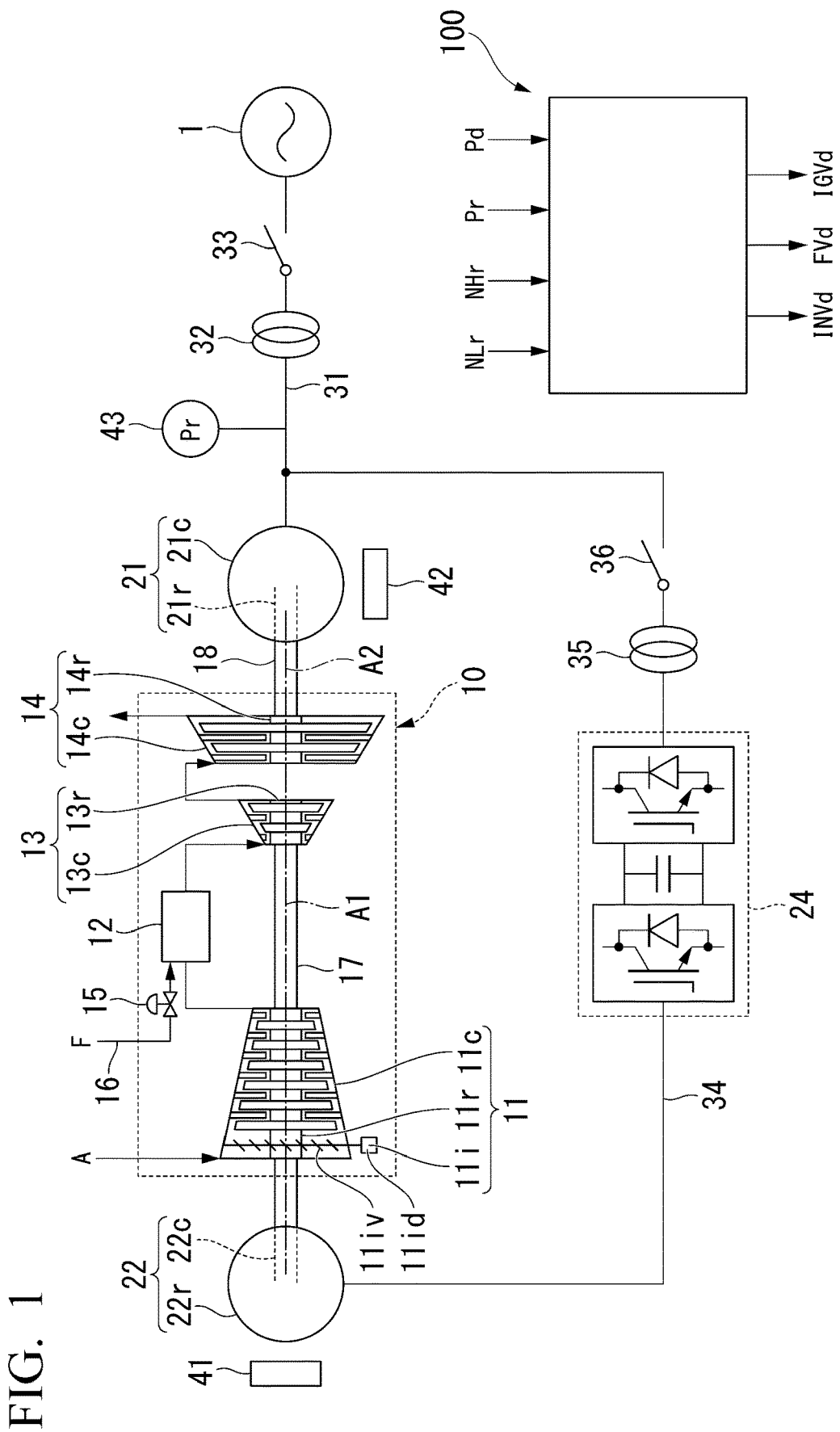
FIG. 1 is a system diagram of a two-shaft gas turbine power generation facility in one embodiment according to the present invention.

As shown in FIG. 1, a two-shaft gas turbine power generation facility of the present embodiment includes a two-shaft gas turbine 10, a power generator 21, an induction motor 22, a frequency converter 24 which controls transmission and reception of electric power between the induction motor 22 and a power system 1, and a control device 100.

The two-shaft gas turbine 10 includes a compressor 11 which compresses air A to generate compressed air, a combustor 12 which combusts a fuel F in the compressed air to generate a combustion gas, a fuel adjustment valve 15 which controls a flow rate of the fuel F supplied to the combustor 12, a high-pressure turbine 13 driven by the combustion gas from the combustor 12, and a low-pressure turbine 14 driven by the combustion gas exhausted from the high-pressure turbine 13.

The compressor 11 has a compressor rotor 11r which rotates about a first shaft line A1 and a compressor casing 11c which covers the compressor rotor 11r. The compressor casing has an intake port for sucking air and a discharge port for discharging the compressed air. The compressor further has an inlet guide vane device (IGV device) 11i which regulates a flow rate of the air sucked into the compressor casing. This IGV device 11i has a vane 11iv disposed on the intake port side in the compressor casing 11c, and a driver 11id for driving the vane 11iv.

The high-pressure turbine 13 has a high-pressure turbine rotor 13r which rotates around the first shaft line A1 and a high-pressure turbine casing 13c which covers the high-pressure turbine rotor 13r. The compressor rotor 11r and the high-pressure turbine rotor 13r are both located on the first shaft line A1 and are connected to each other to form a first rotor 17. The low-pressure turbine 14 has a low-pressure turbine rotor 14r which rotates about a second shaft line A2, and a low-pressure turbine casing 14c which covers the low-pressure turbine rotor 14r. The combustor 12 is connected to a fuel supply source via a fuel line 16. The fuel adjustment valve 15 is provided in the fuel line 16.

The induction motor 22 has a motor rotor 22r mechanically connected to the compressor rotor 11r, and a motor casing 22c which covers the motor rotor 22r. The motor rotor 22r rotates with rotation of the compressor rotor 11r. A rated rotation speed of the high-pressure turbine 13 described above is, for example, 6500 rpm. Therefore, rated rotation speeds of the compressor 11 and the induction motor 22 are also 6500 rpm, for example. Also, the compressor rotor 11r and the motor rotor 22r may be connected to each other via a reduction gear. In this case, if a reduction ratio of the reduction gear is 2, for example, the rated rotation speeds of the high-pressure turbine 13 and the compressor 11 are, for example, 6500 rpm, and the rated rotation speed of the induction motor 22 is 3250 rpm (=6500 rpm/2).

The power generator 21 has a power generator rotor 21r which rotates about the second shaft line A2, and a power generator casing 21c which covers the power generator rotor 21r. This power generator 21 is a synchronous power generator. The power generator rotor 21r and the low-pressure turbine rotor 14r are both located on the second shaft line A2 and mechanically connected to each other to form a second rotor 18. A rated rotation speed of the power generator 21 is, for example, 3000 rpm or 3600 rpm. Therefore, a rated rotation speed of the low-pressure turbine 14 is also 3000 rpm or 3600 rpm, for example. The second rotor 18 is not connected to the first rotor 17. For this reason, the second rotor 18 can rotate independently of the rotation of the first rotor 17.

The power generator 21 is electrically connected to the power system 1 via a main power path 31. The main power path 31 is provided with a transformer 32 and a circuit breaker 33. The induction motor 22 is electrically connected to the power system 1 in parallel with the power generator 21 via a sub-power path 34. The frequency converter 24, the transformer 35, and the circuit breaker 36 are provided on the sub-power path 34. The transformer 35 and the circuit breaker 36 are provided closer to the power system 1 than the frequency converter 24.

When electric power from the induction motor 22 is transmitted to the power system 1, the frequency converter 24 converts a frequency of the electric power from the induction motor 22 into a frequency of the power system 1. Further, when the electric power from the power system 1 is received and supplied to the induction motor 22, the frequency converter 24 converts the frequency of the electric power of the power system 1 into a frequency of the induction motor 22. Therefore, the induction motor 22 functions as a motor for rotating the first rotor 17 and as a power generator.

The induction motor 22 is provided with a first rotation speed meter 41 that detects a rotation speed of the induction motor 22. By detecting the rotation speed of the induction motor 22, the first rotation speed meter 41 also detects the rotation speed of the compressor 11 and the rotation speed of the high-pressure turbine 13. The power generator 21 is provided with a second rotation speed meter 42 that detects a rotation speed of the power generator 21. The second rotation speed meter 42 also detects the rotation speed of the low-pressure turbine 14 by detecting the rotation speed of the power generator 21. The main power path 31 is provided with an output meter 43 for detecting electric power passing therethrough, in other words, an output from the two-shaft gas turbine power generation facility to the power system 1.

Figure 2:
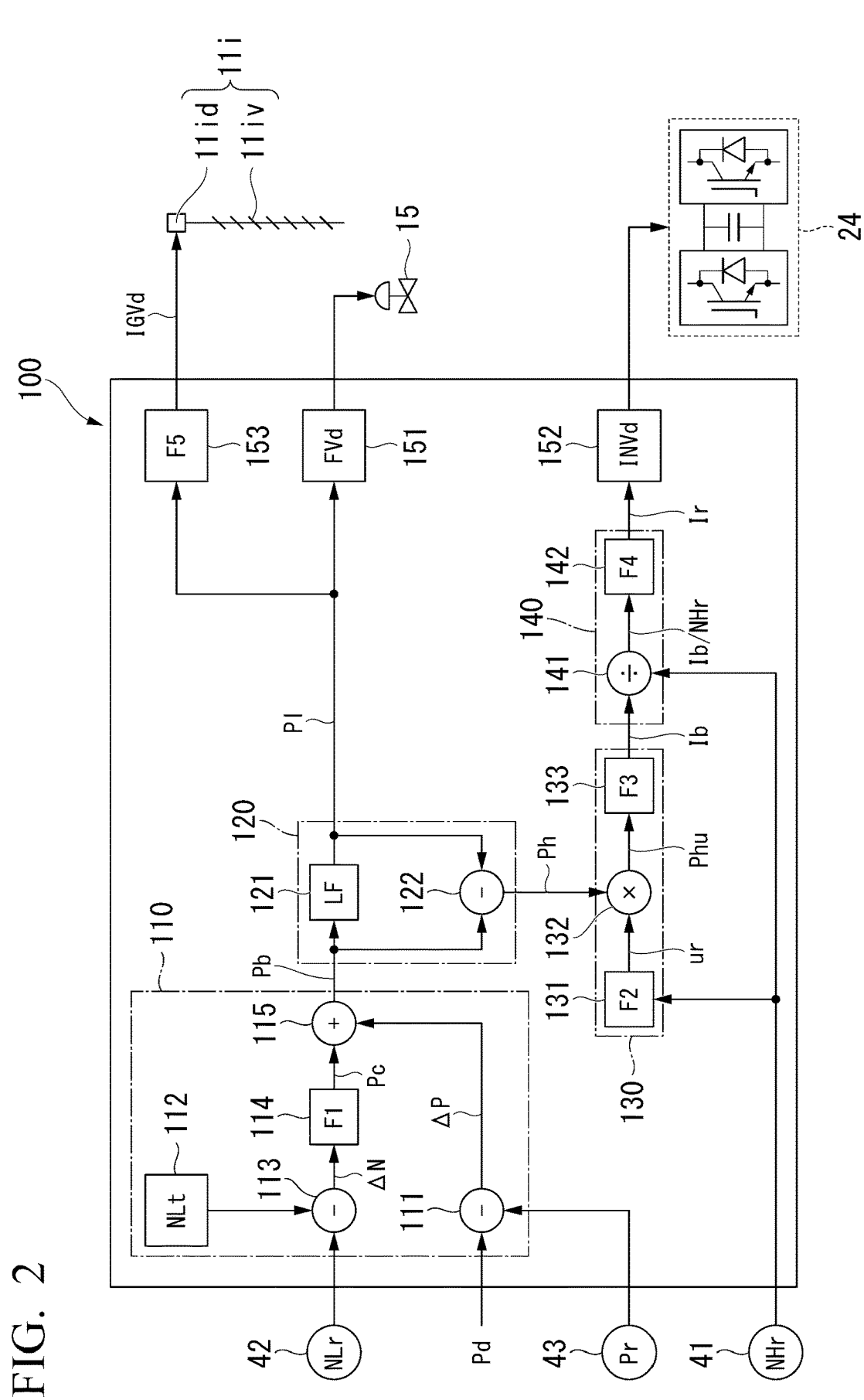
FIG. 2 is a functional block diagram of a control device in one embodiment according to the present invention.

As shown in FIG. 2, the control device 100 has a basic output calculation unit 110, a component separation unit 120, a basic power transmission and reception amount calculation unit 130, a limited power transmission and reception amount calculation unit 140, an opening degree command output unit 151, a power transmission and reception command output unit 152, and an IGV command output unit 153.

The basic output calculation unit 110 obtains a basic output command value Pb in accordance with an output deviation $\Delta P$ between an externally required output Pd and an actual output Pr that is an actual output to the power system 1. The basic output calculation unit 110 includes an output deviation calculator 111, a target rotation speed power generator 112, a rotation speed deviation calculator 113, a converter 114, and an adder 115. The output deviation calculator 111 obtains the output deviation $\Delta P$ (=Pd−Pr) between the externally required output Pd and the actual output Pr that is the actual output to the power system 1. The actual output Pr is an output detected by the output meter 43. The target rotation speed power generator 112 generates a target rotation speed NLt of the low-pressure turbine 14 in a normal operation mode, which will be described later. The rotation speed deviation calculator 113 obtains a rotation speed deviation $\Delta N$(NLt−NLr) between the target rotation speed NLt and a rotation speed NLr of the low-pressure turbine 14 detected by the second rotation speed meter 42. The converter 114 uses the function F1 to convert the rotation speed deviation $\Delta N$ into an output correction value Pc. The adder 115 adds the output deviation $\Delta P$ and the output correction value Pc and outputs the result value as a basic output command value Pb.

Figure 3:
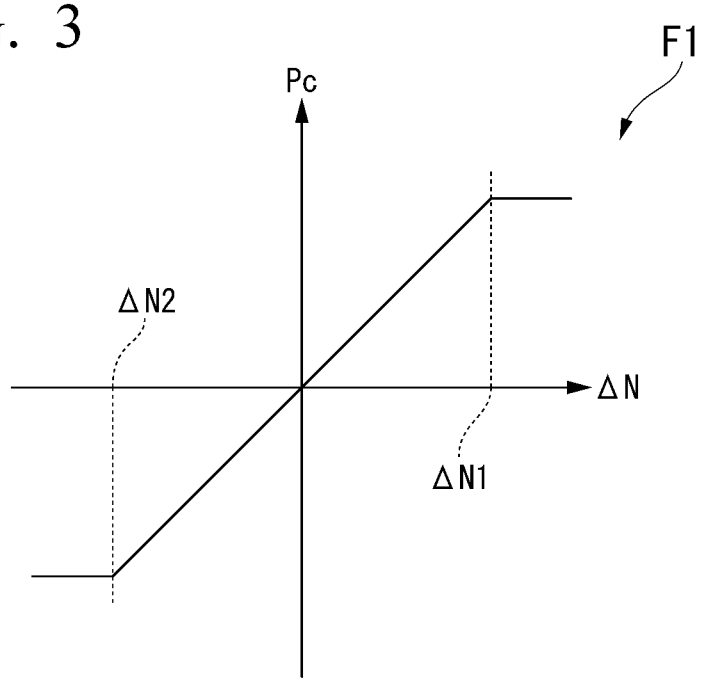
FIG. 3 is an explanatory diagram explaining a function F1 in one embodiment according to the present invention.

As shown in FIG. 3, the function F1 is a function for converting the rotation speed deviation $\Delta N$ into the output correction value Pc. This function F1 is basically a function in which a change in the output correction value Pc has a positive correlation with a change in the rotation speed deviation $\Delta N$. In a case in which this function F1 is used, the output correction value Pc becomes 0 when the rotation speed deviation $\Delta N$ is 0. When the rotation speed deviation $\Delta N$ has a negative value, the output correction value Pc also has a negative value. Also, when the rotation speed deviation $\Delta N$ has a positive value, the output correction value Pc also has a positive value. Here, in an intermediate deviation section between a first rotation speed deviation $\Delta N1$ in which the rotation speed deviation $\Delta N$ is larger than 0 and a second rotation speed deviation $\Delta N2$ in which the rotation speed deviation $\Delta N$ is smaller than 0, the output correction value Pc changes linearly with respect to a change in the rotation speed deviation $\Delta N$. On the other hand, in a large deviation section in which the rotation speed deviation $\Delta N$ is larger than the first rotation speed deviation $\Delta N1$, the output correction value Pc maintains the output correction value Pc when the rotation speed deviation $\Delta N$ is the first rotation speed deviation $\Delta N1$ regardless of the change in the rotation speed deviation $\Delta N$. Further, in a small deviation section in which the rotation speed deviation $\Delta N$ is smaller than the second rotation speed deviation $\Delta N2$, the output correction value Pc maintains the output correction value Pc when the rotation speed deviation $\Delta N$ is the second rotation speed deviation $\Delta N2$ regardless of the change in the rotation speed deviation $\Delta N$.

Figure 4:
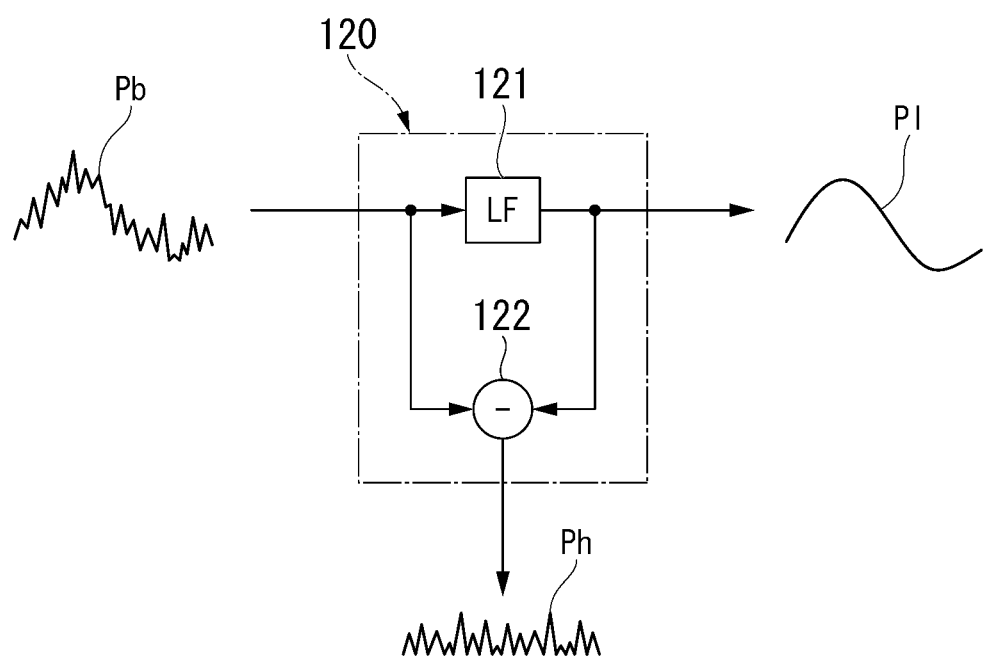
FIG. 4 is a functional block diagram of a component separation unit in one embodiment according to the present invention.

The component separation unit 120 divides the basic output command value Pb into a high-frequency component Ph and a low-frequency component Pl. The component separation unit 120 has a low-pass filter 121 and a subtractor 122. As shown in FIG. 4, the low-pass filter 121 outputs only the low-frequency component Pl in the basic output command value Pb. The subtractor 122 outputs a value obtained by subtracting the low-frequency component Pl from the basic output command value Pb as the high-frequency component Ph.

The basic power transmission and reception amount calculation unit 130 obtains a basic power transmission and reception amount Ib of the electric power between the induction motor 22 and the power system 1 on the basis of the high-frequency component Ph of the basic output command value Pb. As shown in FIG. 2, the basic power transmission and reception amount calculation unit 130 includes a utilization factor calculator 131, a utilized high-frequency component calculator 132, and a basic power transmission and reception amount output device 133. The utilization factor calculator 131 uses the function F2 to determine a component utilization factor ur corresponding to an actual rotation speed NHr, which is an actual rotation speed of the high-pressure turbine 13. Further, the actual rotation speed of the high-pressure turbine 13 is equal to the rotation speed of the induction motor 22 detected by the first rotation speed meter 41. Also, the utilization factor calculator 131 may be omitted. The utilized high-frequency component calculator 132 is a multiplier, multiplies the high-frequency component Ph by the component utilization factor ur, and outputs the result value as a utilized high-frequency component Phu. The basic power transmission and reception amount output device 133 uses the function F3 to convert the utilized high-frequency component Phu into the basic power transmission and reception amount Ib and outputs this basic power transmission and reception amount Ib.

Figure 5:
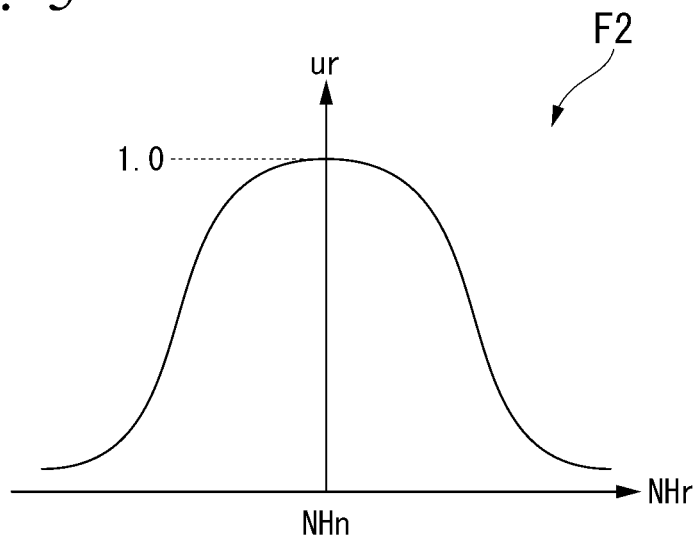
FIG. 5 is an explanatory diagram explaining a function F2 in one embodiment according to the present invention.

As shown in FIG. 5, the function F2 is a function indicating a relationship between the actual rotation speed NHr, which is the actual rotation speed of the high-pressure turbine 13, and the component utilization factor ur. In a case in which this function F2 is used, the actual rotation speed NHr becomes the component utilization factor ur "1" in which a rated rotation speed NHn (for example, 6500 rpm) of the high-pressure turbine 13 is maximum. In the case in which this function F2 is used, the component utilization factor ur decreases as the actual rotation speed NHr becomes larger than the rated rotation speed NHn. Also, in the case in which this function F2 is used, the component utilization factor ur decreases as the actual rotation speed NHr becomes smaller than the rated rotation speed NHn. In the case in which this function F2 is used, whether the actual rotation speed NHr is larger or smaller than the rated rotation speed NHn, the component utilization factor ur becomes a value much closer to "1" at a value closer to the rated rotation speed NHn.

Figure 6:
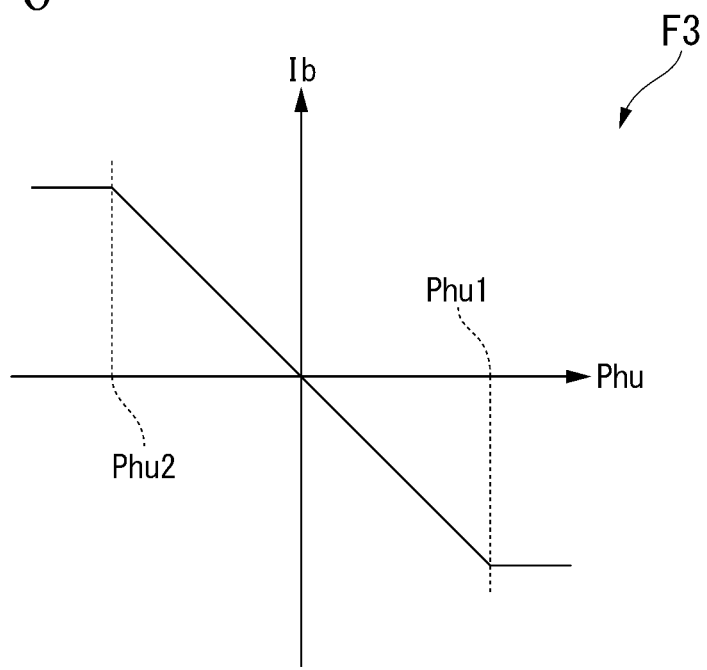
FIG. 6 is an explanatory diagram explaining a function F3 in one embodiment according to the present invention.

As shown in FIG. 6, the function F3 is a function for converting the utilized high-frequency component Phu into the basic power transmission and reception amount Ib. This function F3 is basically a function in which a change in the basic power transmission and reception amount Ib has a negative correlation with a change in the utilized high-frequency component Phu. In a case in which this function F3 is used, the basic power transmission and reception amount Ib becomes 0 when the utilized high-frequency component Phu is 0. When the utilized high-frequency component Phu has a negative value, the basic power transmission and reception amount Ib has a positive value. Also, when the utilized high-frequency component Phu has a positive value, the basic power transmission and reception amount Ib has a negative value. The case in which the power transmission and reception amount is a positive value is a case in which the induction motor 22 functions as the power generator 21 and the electric power from the induction motor 22 is supplied to the power system 1. On the other hand, the case in which the power transmission and reception amount is a negative value is a case in which the induction motor 22 functions as a motor and the electric power from the power system 1 is supplied to the induction motor 22. Here, in an intermediate section between a first utilized high-frequency component value Phu1 in which a value of the utilized high-frequency component Phu is larger than 0 and a second utilized high-frequency component value Phu2 in which the value of the utilized high-frequency component Phu is smaller than 0, the basic power transmission and reception amount Ib changes linearly with respect to a change in the utilized high-frequency component Phu. On the other hand, in a large section in which the utilized high-frequency component Phu is larger than the first utilized high-frequency component value Phu1, the basic power transmission and reception amount Ib maintains the basic power transmission and reception amount Ib when the utilized high-frequency component Phu is the first utilized high-frequency component value Phu1 regardless of the change in the utilized high-frequency component Phu. Further, in a small section in which the utilized high-frequency component Phu is smaller than the second utilized high-frequency component value Phu2, the basic power transmission and reception amount Ib maintains the basic power transmission and reception amount Ib when the utilized high-frequency component Phu is the second utilized high-frequency component Phu value regardless of the change in the utilized high-frequency component Phu. As described above, the reason why the basic power transmission and reception amount Ib is not changed in the large section and the small section is to adjust it not to deviate from the capacity of the induction motor 22, thereby protecting the induction motor 22.

The limited power transmission and reception amount calculation unit 140 obtains the limited power transmission and reception amount Ir in accordance with a power transmission and reception-rotation speed ratio Ib/NHr that is a ratio of the basic power transmission and reception amount Ib to the actual rotation speed NHr, which is the actual rotation speed of the high-pressure turbine 13. The limited power transmission and reception amount calculation unit 140 has a power transmission and reception-rotation speed ratio calculator 141 and a limited power transmission and reception amount output device 142. The power transmission and reception-rotation speed ratio calculator 141 is a divider that, divides the basic power transmission and reception amount Ib by the actual rotation speed NHr, and outputs the result value as the power transmission and reception-rotation speed ratio Ib/NHr. That is, the power transmission and reception-rotation speed ratio Ib/NHr is a value obtained by dividing the basic power transmission and reception amount Ib by the actual rotation speed NHr. The limited power transmission and reception amount output device 142 uses the function F4 to obtain the limited power transmission and reception amount Ir in accordance with the power transmission and reception-rotation speed ratio Ib/NHr and outputs the limited power transmission and reception amount Ir.

Figure 7:
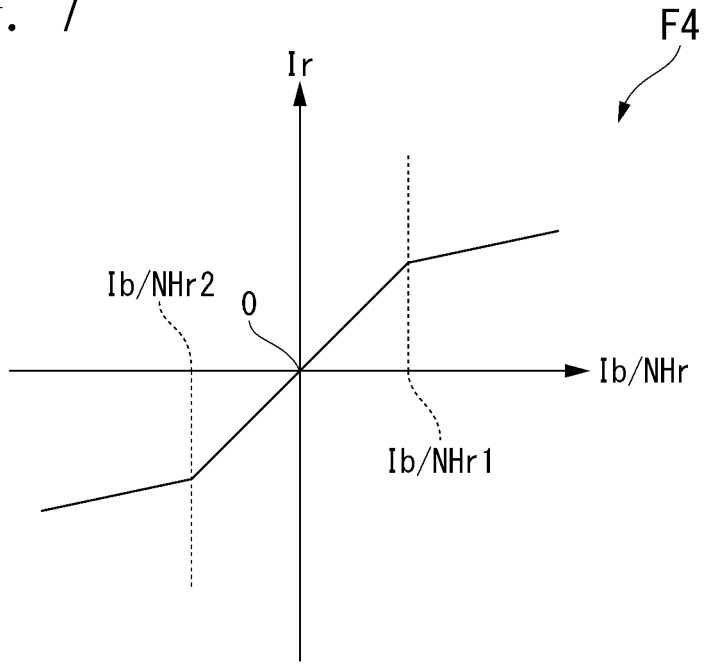
FIG. 7 is an explanatory diagram explaining a function F4 in one embodiment according to the present invention.

As shown in FIG. 7, the function F4 is a function for converting the power transmission and reception-rotation speed ratio Ib/NHr to the limited power transmission and reception amount Ir. The function F4 is a function in which a change in the limited power transmission and reception amount Ir has a positive correlation with a change in the power transmission and reception-rotation speed ratio Ib/NHr. In a case in which this function F4 is used, the limited power transmission and reception amount Ir becomes 0 when the power transmission and reception-rotation speed ratio IbNHr is 0. When the power transmission and reception-rotation speed ratio IbNHr has a negative value, the limited power transmission and reception amount Ir also has a negative value. Further, when the power transmission and reception-rotation speed ratio Ib/NHr is a positive value, the limited power transmission and reception amount Ir also has a positive value. Here, in an intermediate ratio section in which the power transmission and reception-rotation speed ratio Ib/NHr is between a first power transmission and reception-rotation speed ratio Ib/NHr1 in which the power transmission and reception-rotation speed ratio Ib/NHr is greater than 0 and a second power transmission and reception-rotation speed ratio Ib/NHr2 in which the power transmission and reception-rotation speed ratio Ib/NHr is less than 0, the limited power transmission and reception amount Ir changes linearly with respect to a change in the power transmission and reception-rotation speed ratio Ib/NHr. Further, in a large ratio section in which the power transmission and reception-rotation speed ratio Ib/NHr is larger than the first power transmission and reception-rotation speed ratio Ib/NHr1 and in a small ratio section in which the power transmission and reception-rotation speed ratio Ib/NHr is smaller than the second power reception-rotation speed ratio Ib/NHr2, the limited power transmission and reception amount Ir changes linearly with respect to the change of the power transmission and reception-rotation speed ratio IbNHr, but a change amount of the limited power transmission and reception amount Ir is smaller than a change amount of the power transmission and reception-rotation speed ratio Ib/NHr. That is, in the large ratio section and the small ratio section, the function F4 blunts the change in the limited power transmission and reception amount Ir with respect to the change in the power transmission and reception-rotation speed ratio IbNHr.

The opening degree command output unit 151 obtains an opening degree of the fuel adjustment valve 15 and outputs an opening degree command FVd indicating the opening degree to the fuel adjustment valve 15. The opening degree command output unit 151 obtains the opening degree of the fuel adjustment valve 15 on the basis of the low-frequency component Pl of the basic output command value Pb. The opening degree command output unit 151 has a function indicating a relationship between the basic output command value Pb and the opening degree of the fuel adjustment valve 15 at which a fuel flow rate corresponding to the basic output command value Pb is obtained. The opening degree command output unit 151 uses this function to obtain an opening degree corresponding to a value of the low-frequency component Pl of the basic output command value Pb output from the component separation unit 120.

The power transmission and reception command output unit 152 creates a power transmission and reception command INVd indicating a power transmission and reception amount between the induction motor 22 and the power system 1 and outputs this power transmission and reception command INVd to the frequency converter 24. The power transmission and reception command output unit 152 creates a power transmission and reception command INVd indi-cating the limited power transmission and reception amount Ir output from the limited power transmission and reception amount calculation unit 140.

Figure 8:
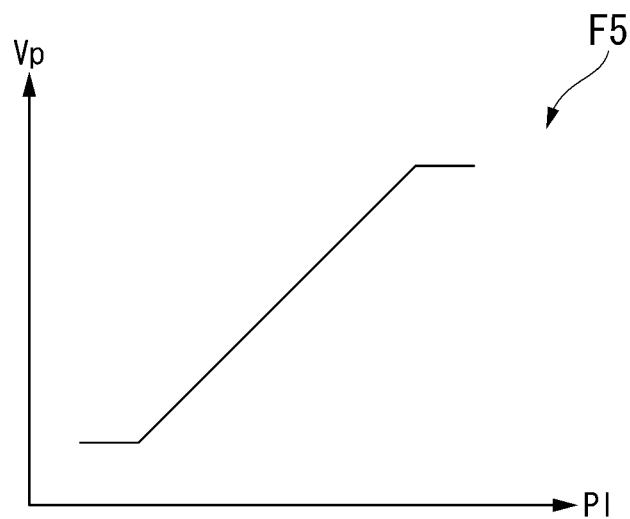
FIG. 8 is an explanatory diagram explaining a function F5 in one embodiment according to the present invention.

The IGV command output unit 153 creates an IGV command IGVd indicating an opening degree of the vane 11iv in the IGV device 11i and outputs this IGV command IGVd to a driver 11id of the IGV device 11i. The IGV command output unit 153 has a function F5 indicating a relationship between the low-frequency component Pl of the basic output command value Pb and the opening degree of the vane 11iv at which an intake amount corresponding to the low-frequency component Pl is obtained. As shown in FIG. 8, the function F5 is a function in which a change in an opening degree Vp has a positive correlation with a change in the low-frequency component Pl. The IGV command output unit 153 uses this function F5 to obtain the opening degree Vp of the vane 11iv corresponding to a value of the low-frequency component Pl of the basic output command value Pb output from the component separation unit 120.

The control device 100 described above is configured of a computer. Therefore, each functional configuration of the control device 100 described above is configured of an input/output interface of the computer, a CPU that performs various calculations, a memory that stores programs executed by the CPU, and the like.

Further, each functional configuration of the control device 100 described above is a functional configuration in a normal operation mode when the two-shaft gas turbine 10 is normally operated. For this reason, the control device 100 additionally includes a functional configuration for a start mode when the two-shaft gas turbine 10 is started. Since the present embodiment is characterized by the control and operation of the two-shaft gas turbine 10 in the normal operation mode, the description of the functional configuration in the start mode will be omitted.

Next, an operation of the two-shaft gas turbine power generation facility described above will be described.

As shown in FIG. 1, the compressor 11 of the two-shaft gas turbine 10 compresses the air A and supplies the compressed air A to the combustor 12. The combustor 12 is supplied with the fuel F in addition to the compressed air A. In the combustor 12, the fuel F is combusted in the compressed air A to generate a high temperature and high-pressure combustion gas. This combustion gas is sent from the combustor 12 into the high-pressure turbine casing 13c to rotate the high-pressure turbine rotor 13r. A rotational driving force generated by the high-pressure turbine 13 is used to rotate the compressor rotor 11r. The combustion gas that rotates the high-pressure turbine rotor 13r is exhausted from the high-pressure turbine casing 13c and flows into the low-pressure turbine casing 14c. This combustion gas rotates the low-pressure turbine rotor 14r. The rotation of the low-pressure turbine rotor 14r also rotates the power generator rotor 21r connected to the low-pressure turbine rotor 14r. As a result, the power generator 21 generates electric power. The electric power from the power generator 21 is sent to the power system 1 via the main power path 31.

When a start command is input to the control device 100, the frequency converter 24 is controlled, for example, in a predetermined starting pattern until the two-shaft gas turbine 10 shifts to the normal operation mode. Further, the control device 100 controls the opening degree of the fuel adjustment valve 15 in a predetermined starting pattern, for example, until the two-shaft gas turbine 10 shifts to the normal operation mode.

Specifically, the control device 100 causes the frequency converter 24 to receive electric power from the power system 1 and send the electric power to the induction motor 22. In this case, the frequency converter 24 gradually increases a frequency of the electric power sent to the induction motor 22 in accordance with an instruction from the control device 100. As a result, the first rotor 17 of the two-shaft gas turbine 10 starts to rotate, and the rotation speed of the first rotor 17 gradually increases. When the rotation speed of the first rotor 17 becomes equal to or higher than a predetermined rotation speed, the control device 100 opens the fuel adjustment valve 15 and gradually increases the opening degree of the fuel adjustment valve 15. As a result, the fuel supply to the combustor 12 is started, and the fuel supply amount to the combustor 12 gradually increases. In this case, since the compressor rotor 11r is also rotating at a speed equal to or higher than the predetermined rotation speed, the compressor 11 compresses the air A and supplies the compressed air to the combustor 12. As the rotation speed of the compressor rotor 11r increases, a pressure of the compressed air increases and a flow rate of the compressed air supplied to the combustor 12 also increases. In the combustor 12, the fuel F is combusted in the compressed air to generate a high temperature and high-pressure combustion gas. This combustion gas is sent from the combustor 12 into the high-pressure turbine casing 13c to rotate the high-pressure turbine rotor 13r. A rotational driving force generated by the high-pressure turbine 13 is used to rotate the compressor rotor 11r. The combustion gas that rotates the high-pressure turbine rotor 13r is exhausted from the high-pressure turbine casing 13c and flows into the low-pressure turbine casing 14c. This combustion gas rotates the low-pressure turbine rotor 14r.

As the fuel supply amount increases, an amount of combustion gas generated in the combustor 12 increases, and when the rotation speed of the high-pressure turbine rotor 13r increases, the first rotor 17 including the high-pressure turbine rotor 13r and the compressor rotor 11r can rotate independently. In this state, the power supply from the power system 1 to the induction motor 22 ends. Even after that, the fuel supply amount increases, and the rotation speeds of the first rotor 17 and the second rotor 18 further increase. When the rotation speed of the second rotor 18, that is, the rotation speed of the low-pressure turbine rotor 14r and the rotation speed of the power generator rotor 21r, reach 3000 rpm, for example, the circuit breaker 33 is closed, and the power generator 21 is also inserted into the power system 1.

As a result, the electric power generated by the rotation of the power generator rotor 21r is sent to the power system 1.

When the power generator 21 is inserted into the power system 1, the start mode of the two-shaft gas turbine 10 ends and shifts to the normal operation mode. As described above, the induction motor 22 functions exclusively as a motor in the start mode.

In the normal operation mode, the control device 100 basically controls the frequency converter 24, the fuel adjustment valve 15, and the IGV device 11i in accordance with the externally required output Pd, or the like.

Figure 9:
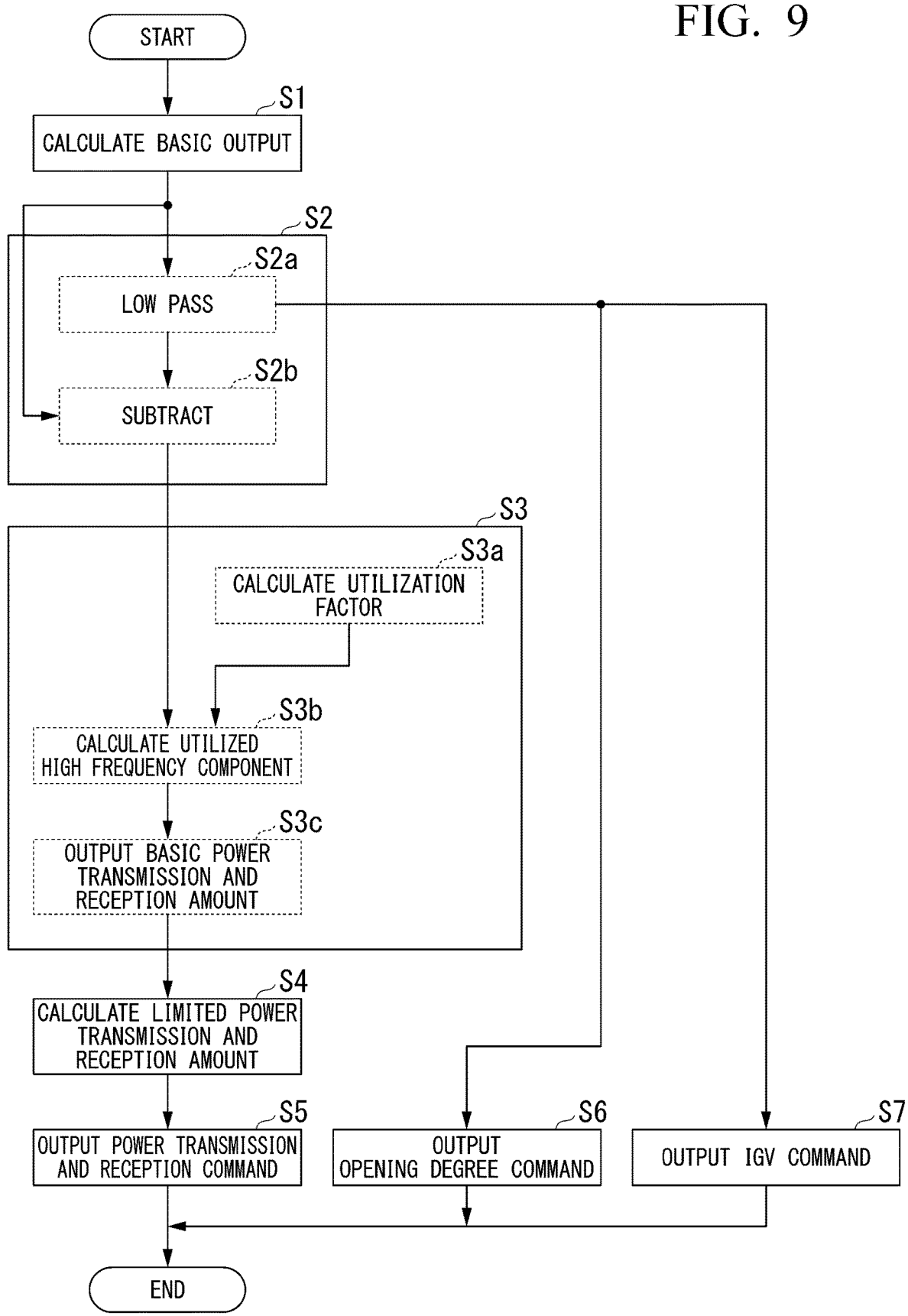
FIG. 9 is a flowchart showing an operation of a control device in one embodiment according to the present invention.

Hereinafter, an operation of the control device 100 in the normal operation mode will be described with reference to the flowchart shown in FIG. 9.

The basic output calculation unit 110 obtains the basic output command value Pb in accordance with the externally required output Pd or the like (S1: a basic output calculation process). In the basic output calculation process (S1), the output deviation calculator 111 obtains the output deviation $\Delta P$ (=Pd−Pr) between the externally required output Pd and the actual output Pr to the power system 1 detected by the output meter 43. In the basic output calculation process (S1), the rotation speed deviation calculator 113 obtains the rotation speed deviation $\Delta N$ (=NLt−NLr) between the target rotation speed NLt generated by the target rotation speed power generator 112 and the rotation speed NLr of the low-pressure turbine 14 detected by the second rotation speed meter 42. The converter 114 uses the function F1 described above with reference to FIG. 3 to convert this rotation speed deviation $\Delta N$ into the output correction value Pc. The adder 115 adds the output deviation $\Delta P$ and the output correction value Pc and outputs the result as the basic output command value Pb.

The component separation unit 120 divides the basic output command value Pb into the high-frequency component Ph and the low-frequency component Pl (S2: a component separation process). In this component separation process (S2), as described above with reference to FIG. 4, the low-pass filter 121 outputs only the low-frequency component Pl in the basic output command value Pb (S2a: a low-pass process). Further, in the component separation process (S2), the subtractor 122 subtracts the low-frequency component Pl from the basic output command value Pb and outputs the result as the high-frequency component Ph (S2b: a subtraction process).

The basic power transmission and reception amount calculation unit 130 obtains the basic power transmission and reception amount Ib of the electric power between the induction motor 22 and the power system 1 on the basis of the high-frequency component Ph of the basic output command value Pb (S3: a basic power transmission and reception amount calculation process). In this basic power transmission and reception amount calculation process (S3), the utilization factor calculator 131 obtains the component utilization factor ur in accordance with the actual rotation speed NHr of the high-pressure turbine 13 detected by the first rotation speed meter 41 using the function F2 described above with reference to FIG. 5 (S3a: a utilization factor calculation process). In the basic power transmission and reception amount calculation process (S3), the utilized high-frequency component calculator 132 multiplies the high-frequency component Ph of the basic output command value Pb by the component utilization factor ur and outputs the result as the utilized high-frequency component Phu (S3b: a utilized high-frequency component calculation process). In the basic power transmission and reception amount calculation process (S3), the basic power transmission and reception amount output device 133 uses the function F3 described above with reference to FIG. 6 to convert the utilized high-frequency component Phu into the basic power transmission and reception amount Ib and outputs this basic power transmission and reception amount Ib (S3c: a basic power transmission and reception amount output process).

The limited power transmission and reception amount calculation unit 140 obtains the limited power transmission and reception amount Ir in accordance with the power transmission and reception-rotation speed ratio Ib/NHr (S4: a limited power transmission and reception amount calculation process). In this limited power transmission and reception amount calculation process (S4), the power transmission and reception-rotation speed ratio calculator 141 divides the basic power transmission and reception amount Ib by the actual rotation speed NHr of the high-pressure turbine 13 detected by the first rotation speed meter 41 and outputs the result as the power transmission and reception-rotation speed ratio Ib/Nh. The limited power transmission and reception amount output device 142 uses the function F4 described above with reference to FIG. 7 to obtain the limited power transmission and reception amount Ir in accordance with the basic power transmission and reception-rotation speed ratio Ib/NHr and outputs the limited power transmission and reception amount Ir.

The power transmission and reception command output unit 152 creates the power transmission and reception command INVd indicating the limited power transmission and reception amount Ir output from the limited power transmission and reception amount calculation unit 140 and outputs the power transmission and reception command INVd to the frequency converter 24 (S5: a power transmission and reception command output process).

When the frequency converter 24 receives the power transmission and reception command INVd, the power transmission and reception amount passing through the frequency converter 24 is set to the power transmission and reception amount indicated by the power transmission and reception command INVd. In a case in which it is assumed that the power transmission and reception amount indicated by the power transmission and reception command INVd is a positive value, the frequency converter 24 sends the power from the induction motor 22 to the power system 1. That is, in this case, the induction motor 22 transmits the electric power to the power system 1. Further, in a case in which the power transmission and reception amount indicated by the power transmission and reception command INVd is a negative value, the frequency converter 24 supplies the electric power from the power system 1 to the induction motor 22. That is, in this case, the induction motor 22 receives the electric power from the power system 1.

The opening degree command output unit 151 obtains the opening degree Vp of the fuel adjustment valve 15 on the basis of the low-frequency component Pl of the basic output command value Pb using the function F5 described with reference to FIG. 8 and outputs the opening degree command FVd indicating the opening degree Vp to the fuel adjustment valve 15 (S6: an opening degree command output process).

When the fuel adjustment valve 15 receives the opening degree command FVd, the opening degree of the fuel adjustment valve 15 is set to the opening degree indicated by the opening degree command FVd. As a result, the flow rate of the fuel F supplied to the combustor 12 becomes a fuel flow rate corresponding to the low-frequency component Pl of the basic output command value Pb. As a result, the output from the two-shaft gas turbine 10, that is, the output from the power generator 21, becomes an output corresponding to the low-frequency component Pl of the basic output command value Pb.

The IGV command output unit 153 creates the IGV command IGVd indicating the opening degree of the vane 11iv in the IGV device 11i and outputs the IGV command IGVd to the driver 11id of the IGV device 11i. When the driver 11id receives the IGV command IGVd, the driver 11id sets the opening degree of the vane 11iv of the IGV device 11i to the opening degree indicated by the IGV command IGVd. As a result, the flow rate of the air A sucked by the compressor 11 becomes a flow rate of the air corresponding to the low-frequency component Pl of the basic output command value Pb.

In the present embodiment, the high-frequency component Ph of the basic output command value Pb calculated on the basis of the required output Pd, in other words, a drastic change in the required output Pd is managed by the power transmission and reception of the induction motor 22 for the power system 1. Also, in the present embodiment, the low-frequency component Pl of the basic output command value Pb calculated on the basis of the required output Pd, in other words, a relatively gradual change in the required output Pd is managed by the output from the power generator 21 accompanying driving of the two-shaft gas turbine 10.

It is assumed that the component separation unit 120 is not provided, that is, the output command value that determines the opening degree of the fuel adjustment valve 15 includes the high-frequency component Ph as well as the low-frequency component Pl. In this case, the fuel adjustment valve 15 repeats a rapid change of the opening degree in response to the high-frequency component Ph of the output command value. Therefore, the life span consumption of the fuel adjustment valve 15 in this case is reduced.

However, in the present embodiment, since the output command value that determines the opening degree of the fuel adjustment valve 15 does not include the high-frequency component Ph, the fuel adjustment valve 15 does not repeat the rapid change of the opening degree. Therefore, in the present embodiment, the life span consumption of the fuel adjustment valve 15 can be reduced. However, in the present embodiment, the drastic change in the required output Pd cannot be managed by the adjustment of the opening degree of the fuel adjustment valve 15. However, in the present embodiment, as described above, the drastic change in the required output Pd is managed exclusively by the power transmission and reception of the induction motor 22. Further, the time from when the required output Pd changes until the power transmission and reception amount for the power system 1 changes due to the power transmission and reception of the induction motor 22 is much shorter than the time from when the required output Pd changes until a power generation amount of the power generator 21 changes as the flow rate of the fuel changes. That is, a change responsiveness of the power transmission and reception amount of the induction motor 22 to the change of the required output Pd is much higher than a change responsiveness of a power generation amount of the power generator 21 with respect to the change of the required output Pd. For this reason, in the present embodiment, the output responsiveness to the drastic change in the required output Pd can be secured. The frequency converter 24 of the present embodiment repeats an abrupt operation in order to rapidly change the power transmission and reception amount in accordance with the high-frequency component Ph of the output command value. However, since the operation of the frequency converter 24 is an electrical operation, the life span of the frequency converter 24 is hardly consumed even if the operation is rapid or slow.

As described above, in the present embodiment, it is possible to reduce the life span consumption of the fuel adjustment valve 15 while output responsiveness to the drastic change in the required output Pd is ensured.

On the other hand, the rotation speed of the induction motor 22 changes in accordance with the power transmission and reception amount indicated by the power transmission and reception command INVd for the frequency converter 24. The motor rotor 22r is mechanically connected to the compressor rotor 11r, and thus, when the rotation speed of the induction motor 22 changes, the rotation speed of the compressor 11 also changes accordingly and the flow rate of the compressed air sent to the combustor 12 changes.

In the present embodiment, since the flow rate of the fuel supplied to the combustor 12 is determined on the basis of the low-frequency component Pl in the required output Pd, the flow rate of the fuel only changes slowly even if the control device 100 receives a rapidly changing required output Pd. On the other hand, in the present embodiment, the rotation speeds of the induction motor 22 and the compressor 11 are inevitably determined on the basis of the high-frequency component Ph in the required output Pd, and thus, when the control device 100 receives the rapidly changing required output Pd, the flow rate of the compressed air sent to the combustor 12 drastically changes. For this reason, in the present embodiment, in a case in which the control device 100 receives the rapidly changing required output Pd, a fuel-air ratio F/A, which is a ratio between a flow rate of the fuel supplied to the combustor 12 and a flow rate of the compressed air, may deviate from a target fuel-air ratio.

That is, as in the present embodiment, when the opening degree of the fuel adjustment valve 15 is determined on the basis of the low-frequency component Pl in the required output Pd and the power transmission and reception amount of the induction motor 22 is determined on the basis of the high-frequency component Ph in the required output Pd, a case in which the fuel-air ratio F/A deviates from the target fuel-air ratio so that the fuel cannot be stably combusted in the combustor 12 may occur.

Figure 10:
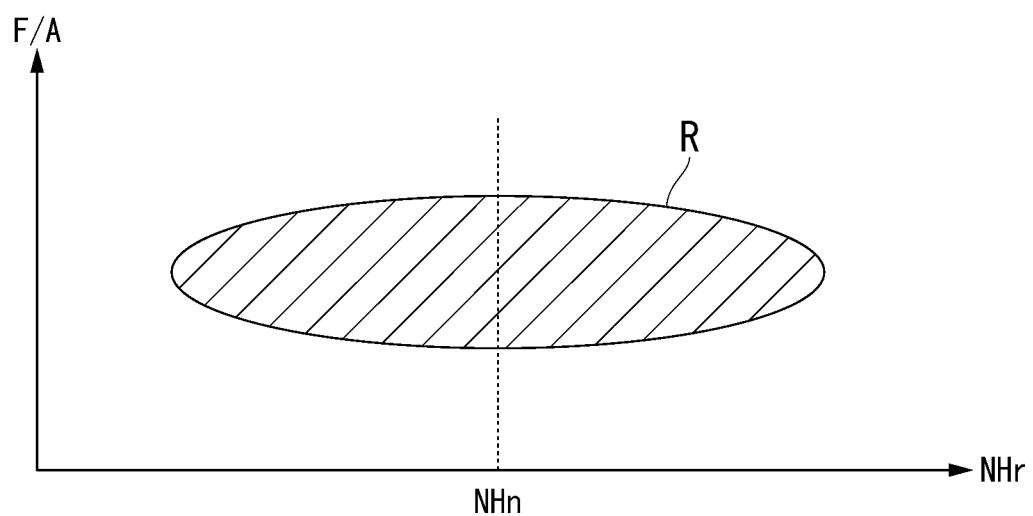
FIG. 10 is an explanatory diagram showing a fuel-air ratio region R in which stable combustion is possible.

As shown in FIG. 10, a width of the fuel-air ratio region R in which stable combustion is possible becomes widest when the rotation speed NHr of the high-pressure turbine 13 is the rated rotation speed NHn. The width of the fuel-air ratio region R in which stable combustion is possible becomes gradually narrower as the rotation speed NHr of the high-pressure turbine 13 becomes larger than the rated rotation speed NHn and as the rotation speed NHr of the high-pressure turbine 13 becomes smaller than the rated rotation speed NHn. This is because the high-pressure turbine 13 and the combustor 12 are designed on the basis that the high-pressure turbine 13 rotates at the rated speed NHn.

As described above, the width of the fuel-air ratio region R in which stable combustion is possible changes as the rotation speed NHr of the high-pressure turbine 13 changes. For this reason, in a case in which the rotation speed NHr of the high-pressure turbine 13 is a rotation speed near the rated rotation speed NHn, a possibility of enabling stable combustion increases even if the fuel-air ratio F/A deviates from the target fuel-air ratio. However, as the rotation speed NHr of the high-pressure turbine 13 becomes larger than the rated rotation speed NHn (and becomes smaller than the rated rotation speed NHn), the possibility of enabling stable combustion decreases.

Therefore, in the present embodiment, when the basic power transmission and reception amount calculation unit 130 obtains the basic power transmission and reception amount Ib using the high-frequency component Ph of the basic output command value Pb, it uses the function F2 to set the utilization factor ur of the high-frequency component Ph to 1 at the maximum when the rotation speed NHr of the high-pressure turbine 13 is the rated rotation speed NHn and decreases the utilization factor ur of the high-frequency component Ph as the rotation speed NHr of the high-pressure turbine 13 becomes larger than the rated rotation speed NHn and becomes smaller than the rated rotation speed NHn. As a result, in the present embodiment, it is possible to inhibit deviation of the actual fuel-air ratio F/A from the target fuel-air ratio in a region in which the width of the fuel-air ratio region R in which stable combustion is possible is narrow, that is, a region in which the rotation speed NHr of the high-pressure turbine 13 is higher than the rated rotation speed NHn and lower than the rated rotation speed NHn.

As described above, the power transmission and reception-rotation speed ratio Ib/NHr is a value obtained by dividing the basic power transmission and reception amount Ib by the rotation speed NHr of the high-pressure turbine 13. For this reason, in a case in which the basic power transmission and reception amount Ib is constant, the power transmission and reception-rotation speed ratio Ib/NHr decreases when the rotation speed NHr of the high-pressure turbine 13 increases, and the power transmission and reception-rotation speed ratio Ib/NHr increases when the rotation speed NHr of the high-pressure turbine 13 decreases.

In the present embodiment, when the limited power transmission and reception amount calculation unit 140 obtains the limited power transmission and reception amount Ir, in a case in which the power transmission and reception-rotation speed ratio Ib/NHr is in the large ratio section and the small ratio section, the limited power transmission and reception amount calculation unit 140 uses the function F4 to obtain the power transmission and reception amount of which a change with respect to a change of the power transmission and reception-rotation speed ratio Ib/NHr is smaller than that in the intermediate ratio section as the limited power transmission and reception amount Ir. Therefore, in the present embodiment, in the large ratio section or the small ratio section in which the rotation speed NHr of the high-pressure turbine 13 is lower or higher than that in the intermediate ratio section, the power transmission and reception amount of which the change is smaller than the change in the rotation speed NHr becomes the limited power transmission and reception amount Ir. As a result, in the present embodiment, also from this viewpoint, it is possible to inhibit deviation of the actual fuel-air ratio F/A from the target fuel-air ratio in the region in which the width of the fuel-air ratio region R in which stable combustion is possible is narrow.

Therefore, in the present embodiment, since the opening degree of the fuel adjustment valve 15 is determined on the basis of the low-frequency component Pl in the required output Pd and the power transmission and reception amount of the induction motor 22 is determined on the basis of the high-frequency component Ph in the required output Pd, the fuel can be stably combusted in the combustor 12 even if the fuel-air ratio F/A deviates from the target fuel-air ratio.

As described above, in the present embodiment, it is possible to reduce the life span consumption of the fuel adjustment valve 15 and to achieve stable fuel combustion while output responsiveness to a drastic change in the required output Pd is ensured.

According to one aspect of the present invention, it is possible to reduce the life span consumption of devices while output responsiveness is ensured in a case in which the required output changes suddenly.

EXPLANATION OF REFERENCES

1 Power system
10 Two-shaft gas turbine
11 Compressor
11c Compressor casing
11r Compressor rotor
11i IGV device
11iv Vane
11id drive machine
12 Combustor
13 High-pressure turbine
13c High-pressure turbine casing
13r High-pressure turbine rotor 14 Low-pressure turbine
14c Low-pressure turbine casing
14r Low-pressure turbine rotor
15 Fuel adjustment valve
16 Fuel line
17 First rotor
18 Second rotor
21 Power generator
21c Power generator casing
21r Power generator rotor
22 Induction motor
22c Motor casing
22r Motor rotor
24 Frequency converter
31 Main power path
32, 35 Transformer
33, 36 Circuit breaker
34 Sub-power path
41 First rotation speed meter
42 Second rotation speed meter
43 Output meter
100 Control device
110 Basic output calculation unit
111 Output deviation calculator
112 Target rotation speed power generator
113 Rotation speed deviation calculator
114 Converter
115 Adder
120 Component separation unit
121 Low pass filter
122 Subtractor
130 Basic power transmission and reception amount calculation unit
131 Utilization factor calculator
132 Utilized high-frequency component calculator
133 Basic power transmission and reception amount output device
140 Limited power transmission and reception amount calculation unit
141 Power transmission and reception-rotation speed ratio calculator
142 Limited power transmission and reception amount output device
151 Opening degree command output unit
152 Power transmission and reception command output unit
153 IGV command output unit
A Air
F Fuel
F/A Fuel-air ratio
A1 First shaft line
A2 Second shaft line
NHr Rotation speed of high-pressure turbine (actual rotation speed)
NLr Rotation speed of low-pressure turbine (actual rotation speed)
NLt Target rotation speed of low-pressure turbine
ΔN Rotation speed deviation
Pd Required output
Pr Actual output
Pc Output correction value
ΔP Output deviation
Pb Basic output command value
Ph High-frequency component of basic output command value
Phu Utilized high-frequency component
Pl Low-frequency component of basic output command value
Ib Basic power transmission and reception amount
Ib/NHr Power transmission and reception-rotation speed ratio
Ir Limited power transmission and reception amount
IGVd IGV command
INVd Power transmission and reception command
FVd Opening degree command
R Fuel-air ratio region for enabling stable combustion

What is claimed is:

1. A two-shaft gas turbine power generation facility comprising:

a compressor which has a compressor rotor and is configured to compress air with rotation of the compressor rotor to generate compressed air;

a combustor which is configured to combust a fuel in the compressed air to generate a combustion gas;

a fuel adjustment valve which is configured to control a flow rate of the fuel supplied to the combustor based on an opening degree command;

a high-pressure turbine which has a high-pressure turbine rotor mechanically connected to the compressor rotor, and in which the high-pressure turbine rotor is configured to be rotated by the combustion gas;

a low-pressure turbine which has a low-pressure turbine rotor not mechanically connected to the high-pressure turbine rotor, and in which the low-pressure turbine rotor is configured to be rotated by the combustion gas exhausted from the high-pressure turbine;

a power generator which is configured to generate electric power with rotation of the low-pressure turbine rotor and is electrically connected to a power system in which AC power flows;

an induction motor which has a motor rotor mechanically connected to the compressor rotor and is electrically connected to the power system in parallel with the power generator, the induction motor configured to transmit and receive electric power to and from the power system; and a frequency converter which is electrically connected between the induction motor and the power system, the frequency converter configured to:
control transmission and reception of electric power between the induction motor and the power system based on a power transmission and reception and thereby,
convert a frequency of electric power from the induction motor to a frequency of the power system when electric power is transmitted from the induction motor to the power system, and
convert the frequency of electric power from the power system to the frequency of the induction motor when electric power is received from the power system and supplied to the induction motor, wherein a control device of the two-shaft gas turbine power generation facility is programmed to includes:

a basic output calculation unit which obtains a basic output command value based on a deviation between an externally required output and an actual output to the power system;

a component separation unit which divides the basic output command value into a high-frequency component and a low-frequency component;

an opening degree command output unit which obtains a desired opening degree of the fuel adjustment valve based on the low-frequency component of the basic output command value and outputs the opening degree command indicating the desired opening degree to the fuel adjustment valve;

a basic power transmission and reception amount calculation unit which obtains a basic power transmission and reception amount of electric power between the induction motor and the power system based on the high-frequency component of the basic output command value; and a power transmission and reception command output unit which creates the power transmission and reception command indicating a power transmission and reception amount of electric power between the induction motor and the power system based on the basic power transmission and reception amount and outputs the power transmission and reception command to the frequency converter.

2. The two-shaft gas turbine power generation facility according to claim 1, wherein the basic power transmission and reception amount calculation unit includes:

a utilization factor calculator which obtains a component utilization factor based on an actual rotation speed of the high-pressure turbine by using a predetermined relationship between the actual rotation speed of the high-pressure turbine and the component utilization factor, a utilized high-frequency component calculator which obtains a utilized high-frequency component obtained by multiplying the high-frequency component of the basic output command value by the component utilization factor, and a basic power transmission and reception amount output device which converts the utilized high-frequency component into the basic power transmission and reception amount and outputs the basic power transmission and reception amount.

3. The two-shaft gas turbine power generation facility according to claim 2, wherein the predetermined relationship is such that when the actual rotation speed of the high-pressure turbine is lower or higher than an intermediate rotation speed region that includes the rated rotation speed of the high-pressure turbine, the component utilization factor is smaller than the component utilization factor when the actual rotation speed of the high-pressure turbine is at the rated rotation speed of the high pressure turbine.

4. The two-shaft gas turbine power generation facility according to claim 1, wherein the component separation unit includes a low-pass filter which outputs only the low-frequency component of the basic output command value, and a subtracter that subtracts the low-frequency component from the basic output command value to obtain the high-frequency component of the basic output command value.

5. The two-shaft gas turbine power generation facility according to claim 1 further comprising, a limited power transmission and reception amount calculation unit which obtains a limited power transmission and reception amount based on a power transmission and reception-rotation speed ratio of an actual rotation speed of the high-pressure turbine to the basic power transmission and reception amount, wherein the limited power transmission and reception amount calculation unit uses a function that correlates the limited power transmission and reception amount with the power transmission and reception-rotation speed ratio, to obtain the limited power transmission and reception amount based on the power transmission and reception-rotation speed ratio, the function is defined such that when the power transmission and reception-rotation speed ratio is in an intermediate ratio section in which the power transmission and reception-rotation speed ratio is between a first predetermined power transmission and reception-rotation speed ratio value and a second predetermined power transmission and reception-rotation speed ratio value that is smaller than the first power transmission and reception-rotation speed ratio value, there is a first constant change in the limited power transmission and reception amount per unit change in the power transmission and reception-rotation speed ratio, and the function is further defined such that when the power transmission and reception-rotation speed ratio is in a large ratio section in which the power transmission and reception-rotation speed ratio is larger than the first predetermined power transmission and reception-rotation speed ratio value and when the power transmission and reception-rotation speed ratio is in a small ratio section in which the power transmission and reception-rotation speed ratio is smaller than the second predetermined power transmission and reception-rotation speed ratio value, there is a second constant change in the limited power transmission and reception amount per unit change in the power transmission and reception-rotation speed ratio that is smaller than the first constant change in the intermediate ratio section, and wherein the power transmission and reception command output unit creates the power transmission and reception command using the limited power transmission and reception amount and outputs the power transmission and reception command to the frequency converter.

6. A control method for a two-shaft gas turbine power generation facility, the two-shaft gas turbine power generation facility comprising:

a compressor which has a compressor rotor and is configured to compress air with rotation of the compressor rotor to generate compressed air;

a combustor which is configured to combust a fuel in the compressed air to generate a combustion gas;

a fuel adjustment valve which is configured to control a flow rate of the fuel supplied to the combustor based on an opening degree command;

a high-pressure turbine which has a high-pressure turbine rotor mechanically connected to the compressor rotor and in which the high-pressure turbine rotor is configured to be rotated by the combustion gas;

a low-pressure turbine which has a low-pressure turbine rotor not mechanically connected to the high-pressure turbine rotor and in which the low-pressure turbine rotor is configured to be rotated by the combustion gas exhausted from the high-pressure turbine;

a power generator which is configured to generate electric power with rotation of the low-pressure turbine rotor and is electrically connected to a power system in which AC power flows;

an induction motor which has a motor rotor mechanically connected to the compressor rotor and which is electrically connected to the power system in parallel with the power generator, the induction motor configured to transmit and receive electric power to and from the power system; and a frequency converter which is electrically connected between the induction motor and the power system, the frequency converter configured to:

control transmission and reception of electric power between the induction motor and the power system based on a power transmission and reception command and thereby, convert a frequency of electric power from the induction motor to a frequency of the power system when electric power is transmitted from the induction motor to the power system, and convert the frequency of electric power from the power system to the frequency of the induction motor when electric power is received from the power system and supplied to the induction motor, wherein the control method includes programming a control device to execute:

a basic output calculation process of obtaining a basic output command value based on a deviation between an externally required output and an actual output to the power system;

a component distribution process of dividing the basic output command value into a high-frequency component and a low-frequency component;

an opening degree command output process of obtaining a desired opening degree of the fuel adjustment valve based on the low-frequency component of the basic output command value and outputting the opening degree command indicating the desired opening degree to the fuel adjustment valve;

a basic power transmission and reception amount calculation process of obtaining a basic power transmission and reception amount of electric power between the induction motor and the power system based on the high-frequency component of the basic output command value; and a power transmission and reception command output process of creating the power transmission and reception command indicating a power transmission and reception amount of electric power between the induction motor and the power system based on the basic power transmission and reception amount and outputting the power transmission and reception command to the frequency converter.

7. The control method for the two-shaft gas turbine power generation facility according to claim 6, wherein the basic power transmission and reception amount calculation process includes:

a utilization factor calculation process of obtaining a component utilization factor based on an actual rotation speed of the high-pressure turbine by using a predetermined relationship between the actual rotation speed of the high-pressure turbine and the component utilization factor, a utilized high-frequency component calculation process of obtaining a utilized high-frequency component by multiplying the high-frequency component by the component utilization factor, and a basic power transmission and reception amount output process of converting the utilized high-frequency component into the basic power transmission and reception amount and outputting the basic power transmission and reception amount.

8. The control method for the two-shaft gas turbine power generation facility according to claim 7, wherein the predetermined relationship is such that when the actual rotation speed of the high-pressure turbine is lower or higher than an intermediate rotation speed region that includes the rated rotation speed of the high-pressure turbine, the component utilization factor may be smaller than the component utilization factor when the actual rotation speed of the high-pressure turbine is at the rated rotation speed of the high-pressure turbine.

9. The control method for the two-shaft gas turbine power generation facility according to claim 6, wherein the component distribution process includes a low-pass process of outputting only the low-frequency component of the basic output command value, and a subtraction process of outputting the high-frequency component obtained by subtracting the low-frequency component from the basic output command value.

10. The control method for the two-shaft gas turbine power generation facility according to claim 6 further comprising, executing a limited power transmission and reception amount calculation process of obtaining a limited power transmission and reception amount based on a power transmission and reception-rotation speed ratio that is a ratio of an actual rotation speed the high-pressure turbine to the basic power transmission and reception amount, wherein the limited power transmission and reception amount calculation process uses a function that correlates the limited power transmission and reception amount with the power transmission and reception-rotation speed ratio, to obtain the limited power transmission and reception amount based on the power transmission and reception-rotation speed ratio, the function is defined such that when the power transmission and reception-rotation speed ratio is in an intermediate ratio section in which the power transmission and reception-rotation speed ratio is between a first predetermined power transmission and reception-rotation speed ratio value and a second predetermined power transmission and reception-rotation speed ratio value that is smaller than the first power transmission and reception-rotation speed ratio value, there is a first constant change in the limited power transmission and reception amount per unit change in the power transmission and reception-rotation speed ratio, and the function is further defined such that when the power transmission and reception-rotation speed ratio is in a large ratio section in which the power transmission and reception-rotation speed ratio is larger than the first predetermined power transmission and reception-rotation speed ratio value and when the power transmission and reception-rotation speed ratio is in a small ratio section in which the power transmission and reception-rotation speed ratio is smaller than the second predetermined power transmission and reception-rotation speed ratio value, there is a second constant change in the limited power transmission and reception amount per unit change in the power transmission and reception-rotation speed ratio that is smaller than the first constant change in the intermediate ratio section, and the power transmission and reception command output process includes creating the power transmission and reception command using the limited power transmission and reception amount and outputs the power transmission and reception command to the frequency converter.

* * * * *